United States Patent Office 2,785,983
Patented Mar. 19, 1957

2,785,983

FLAVORING MATERIAL AND METHOD OF MAKING THE SAME

Charles W. McMath, Fort Worth, Tex., assignor, by mesne assignments, to The Buckeye Cellulose Corporation, Cincinnati, Ohio, a corporation of Ohio No Drawing. Application June 23, 1953, Serial No. 363,673

7 Claims. (Cl. 99—140)

This invention relates to flavoring or seasoning compositions and to methods of preparing such compositions. More specifically, the invention relates to free-flowing particulate solids containing essential oils, oleoresins or other flavors which are normally of a fluid nature. A preferred embodiment of this invention is a spicy or pungent-type seasoning in the form of discrete particles or granules, such as, for example, an imitation black pepper.

Many attempts have been made in the past to improve the stability of flavorings and seasonings which are normally liquid and/or to facilitate their use (particularly their incorporation and distribution in solid-form food products) by modifying their physical form in one way or another. For example, such spice oils and flavoring extracts have been prepared in the form of pastes, emulsions, and solid particles. Generally, these modified forms have represented a marked improvement in one or more respects but often at the same time disadvantageous characteristics have been introduced or magnified. Thus, during storage there may be separation or evaporation of the active oil or oleoresinous ingredient from the diluent or carrier. Emulsions, for example, are inherently unstable and naturally tend to separate on storage. Also, the solid absorbent or adsorbent type of materials which are commonly used as carriers and fillers in preparing solid granular products from liquid flavorings often increase the exposed surface area of the active flavoring ingredient and thus greatly magnify the problems of atmospheric deterioration and/or loss of strength due to vaporization. Often such solid carriers are hygroscopic and/or tend to cake together and form lumps on standing.

The preparation of imitation black pepper for use as a substitute for the natural product generally involves the incorporation of pungent oils or oleoresins into suitable dry solid particles. Some of the imitation black peppers which have been produced heretofore have approached the natural product in appearance but none has satisfactorily reproduced the aroma and the feel and taste sensations of real black pepper in the mouth. For example, the slightly delayed but sharply localized sensation of heat which is created as an individual particle of the ground natural black pepper is crushed on the tongue and mouth membranes is not experienced with these prior imitation products which create instead an almost instantaneous effect of general heat which is felt rather uniformly over a wide area of the mouth. In addition to these special inferiorities prior imitation black peppers have oftentimes suffered from the other drawbacks previously pointed out above as relatively common in solid-form flavorings in which liquid essences are used, namely deterioration, separation, loss of strength, caking and other such instabilities during storage.

One object of the instant invention is the production of an imitation black pepper which closely approximates the real product not only in appearance but also in such characteristics as aroma, flavor and mouth sensations.

More generally, the object of my invention is to provide improvements in the art of preparing from active ingredients which are liquid, such as oleoresins, essential oils and synthetic essences, spicy or pungent flavorings in the form of dry free-flowing particles having an authentic bite or burn.

It is an object of this invention to provide, from active ingredients which are normally liquid, dry pulverulent flavorings which are most uniform in composition and ideally suited for handling, e. g. as in measuring, weighing, etc., and for incorporation and distribution in food products of a wide variety of descriptions especially in table-ready, solid-form food products such as prepared meats, relishes, and other products which may be consumed without further processing. Another important object of the invention is to make available, aromatic, spicy or pungent solid-form flavorings which can be economically prepared from a liquid active ingredient in dry particulate form and which are free of such common instabilities during storage as separation, loss of strength, caking, or other deterioration.

A further object of my invention is the provision of an improved pungent flavoring principle for use in imitation black pepper and other peppery products. A still further object of the invention is to provide a source of individual solid "hot" particles which can produce a delayed but concentrated sensation of heat when eaten, similar to the effect produced by individual particles of ground natural black pepper, said "hot" particles thereby being ideally suited for use in imitation black peppers.

It is also an object of this invention to provide a simple and versatile method of preparing the various solid form flavoring and seasoning materials herein contemplated.

Various other objects and features of the invention will become apparent from the detailed description and explanation of the invention which follows.

I have discovered that the pungent bite or burn of flavoring oils, oleoresins, esters, and flavoring extracts and essences, or any spicy flavorings of a liquid nature which are soluble or miscible in melted glyceride type fats having relatively high melting points, such as many of the hydrogenated animal and vegetable fats or higher molecular weight fractions thereof, can be made available in the form of dry, free-flowing particles capable of producing unique taste sensations when crushed in the mouth and possessing excellent stability in all respects, being uniform and permanent as to form, flavoring strength, composition, etc. during storage; and exceptionally easy to handle and distribute uniformly through food products in general. These friable, pulverulent, dry solid flavoring materials, which contain as the active ingredients spicy or pungent components which are normally liquid, consist of particles formed by spray-cooling a uniform solution of the active flavoring ingredients in a melted edible hard fat or hydrogenated glyceride oil having a bland flavor and a melting point sufficiently high that the solid particles thus formed from the said solution will have a melting point of at least 115° F. and preferably 125° F. or above. If this melting point is lower than 115° F. these particles will have neither the proper friability at mouth temperatures nor the required resistance to caking during storage. The melting point of the hard fat will, of course, be somewhat higher than that of the solid particles which contain the flavoring matter in solution—just how much higher will depend on the amount and type of flavoring to be dissolved therein. Generally, there will be a difference of about 0.1 to 1.0° F. for each 1% of flavoring included in the finished particles.

On the other hand, the melting point of the hard fat or hydrogenated glyceride oil employed for this purpose should not be high enough to cause damage to the flavoring ingredient during its dissolution in the molten fatty material. This means that the ideal fat for this use will ordinarily have a melting point of between about 120 and 150° F. with the range of 130–140° F. being preferred.

The spray cooling process by which these dry particles are produced is very simple and subject to easy control so as to enable the size of the particles produced to be varied readily as desired. The particles produced tend to be substantially spherical in shape.

I have found that in the dry solid particles produced in the above manner, a concentrated pungent liquid flavoring ingredient can not only be uniformly diluted and blended to any desired strength within the limits of solubility or miscibility with an inert, bland, edible material but can also be protected from volatilization and deterioration by exposure to air. In addition, the particles are very free-flowing and retain their form indefinitely and without caking at all temperatures which are 15° F. or more below their melting point.

I have discovered that particles of this type which contain as the active liquid ingredient a pepper-like flavoring, such as oleoresin capsicum or imitation pepper oils or essences, are ideally suited for use in preparing imitation black peppers. Such "hot" particles produce a sensation in the mouth of a multitude of sharply localized points of heat, bite or burn, the detection of which is slightly delayed and not simultaneous, an effect very much like that experienced with natural black pepper. Apparently the small surface of the substantially spherical particles of the mixture of hard fat and pungent oil does not produce much effect but these particles are so friable that when they are crushed in the mouth a large surface is then exposed which quickly produces an intensified impression at that point. Since the particles are not all crushed simultaneously or immediately when the product is tasted, a slightly delayed but more lasting effect is secured in the mouth at many different spots very much like that produced by the individual particles of ground natural black pepper.

While synthetic essences imitating the flavor of black pepper have been developed for use in preparing imitation black peppers, the active ingredient which is most commonly used in such preparations is oleoresin capsicum, which is defined in the U. S. Pharmacopeia as that portion of the capsicum fruit which is extracted by percolation with ether. The capsicum variety of pepper is generally divided into two main species *C. annuum* and *C. frutescens*. Several different modifications of each of these species are known and while *C. frutescens*, which is sometimes known as Cayenne pepper, is as a rule more pungent and therefore a preferred source of oleoresin capsicum, some of the *C. annuums* are also used for this purpose, especially in this country. The *frutescens* varieties are generally smaller fruits than the *annuums* and are often called chillies. Particularly well-known for their strong bite and sensation of heat are the Mombassu of African chillies, although Japanese chillies are also frequently used.

Although synthetic oils of black pepper, oleoresin capsicum, or any other pungent peppery oil or essence can be used according to my basic invention in preparing "hot" particles for use in imitation black pepper or similar products, those flavorings derived from natural capsicums are preferred because they approach most nearly the true flavor and pungency of natural black pepper. However, all of the previous derivatives of capsicum fruit of which I am aware, such as oleoresin capsicum, contain in addition to the pungent peppery principle an appreciable amount of the red chilli color and typical chilli flavor as well. As a result, both the appearance (the color especially) and the flavor of imitation black peppers which are made using such derivatives are adversely affected thereby.

One aspect of my invention as applied to the production of synthetic pepper products and especially imitation black pepper involves an improved technique for extracting the active principle from the capsicum fruit, whereby the above mentioned undesirable color and flavor is avoided. This is accomplished by extracting the ordinary oleoresin capsicum of commerce with about 70–90% ethyl alcohol and then boiling off the alcohol. For best results the concentration of the alcohol should be between about 75–85%. The extract thus obtained amounts to only about 12–18% of the original oleoresin capsicum extracted and is almost entirely free of the reddish-orange color and chilli flavor. However, it contains almost all of the active pungent principle of the capsicum because the portion of the oleoresin capsicum remaining after extraction is substantially free of burn and pungency. For this reason, the extract thus obtained has been found to be the ideal active ingredient for use in preparing my imitation black pepper.

The following detailed description is an example of the practice of this invention to prepare an imitation black pepper:

(1) The process of separating a pure pungent fraction from oleoresin capsicum is carried out as follows: The oleoresin capsicum is thoroughly mixed with an equal volume of 80% ethyl alcohol at room temperature. The lower non-alcoholic layer is separated by centrifugation and may again be treated in this manner one or more times. The several alcoholic layers are then combined and evaporated at about 24" Hg pressure (absolute) until substantially all of the alcohol and water are removed. The brown oily resinous residue is the concentrated pungent fraction desired.

(2) The process of making the special "hot" particles from the above concentrated pungent liquid is carried out as follows: 3 parts by weight of the above pungent concentrate is dissolved in 97 parts of neutral refined edible cottonseed oil hydrogenated to an iodine value of 8.0 or less and which is heated to about 160° F. or well above its melting point of about 140° F. This solution is then spray cooled by forcing the hot liquid at 150° F. or above through standard spraying nozzles or atomizers located in a column 7 ft. high and 5 ft. in diameter or in air from a height of 6–8 ft. above the receiving pan. The separate droplets solidify as they fall down through the cooler air being forced upwards through the column. The temperature of the air is preferably about 60° F. or less but may range from 40–85° F. The product is collected at the bottom in the form of dry solid particles substantially spherical in shape and varying in diameter from about 0.05 to 1.0 mm. (predominantly about 0.3 mm.) when the orifice size in the Monarch spray head is 0.018 and the spraying pressure is 90–100 p. s. i. Similar results can be obtained by using an atomizer with a pressure drop of 15 p. s. i. or higher. It is of course desirable to obtain the bulk of the product in as narrow a range of particle sizes as possible. The smaller amounts which are formed at the extremes of diameter can easily be removed by sieving.

(3) The process of preparing the final black pepper product consists of blending and mixing together the following ingredients in the stated amounts:

| | Percent |
|---|---|
| a. Cottonseed hull bran, roasted to a dark brown color, particle size −30 to +80 mesh [1], substantially free of lint | 54.7 |
| b. Cottonseed flour (97%—200 mesh) | 5.5 |
| c. Durum wheat flour, −30 to +100 mesh | 29.8 |
| d. Natural black pepper, finely ground to −200 mesh | 5.0 |
| e. Hot particles, prepared in step (2) above | 5.0 |
| | 100.0 |

[1] Mesh sizes are on the Tyler scale.

As regards flavor, items *a*, *b*, and *c* are relatively bland and although they represent 90% of the product, their importance is largely a matter of appearance, in which respect their mixture closely approximates that of ground natural black pepper. Item *d* contributes somewhat to taste but is added mainly for the aroma which it produces in the final mixture in considerable amounts despite its small concentration, because of the large quantity of surface exposed.

Item *e* is primarily responsible for the pungent taste and

"hot" bite of the imitation pepper product and is therefore the most important single ingredient of the product in spite of the relatively small amount of it which is used. By the use of these particles the typical peppery taste and burn is produced in the mouth in a way which closely approaches that of natural black pepper. Thus, each individual hot particle produces its heating effect only when crushed and these individual sensations of heat are therefore experienced in many spots, but locally and lastingly as in the natural product rather than generally and instantaneously as in most synthetic preparations.

The specific preparation outlined above illustrates the general techniques involved in my invention. Considerable variation is of course possible in both the formula and the techniques applied, as well as in the end results which can be attained thereby.

For example, in preparing the purified pungent fraction in step (1) above, ethyl alcohol of any composition from 70 to 90 at least may be used. Also the procedure of extracting the active principle from the oleoresin capsicum can be modified considerably. Thus, variations are possible in the temperature of extraction, in the number of times the oleoresin is extracted with alcohol, and in the proportion of alcohol which is employed in each extraction. The most practical procedure would be the use of continuous countercurrent extraction. Ordinarily the extraction is carried on at about room temperature though there is some advantage in raising the temperature to about 100° F. or slightly above. Obviously it is advantageous to use as little alcohol as is necessary to extract the active principles since this alcohol should be evaporated in order to recover the pungent fraction in the form most suitable for further use. Ordinarily the total alcohol usage would amount to about 6 to 12 volumes per volume of oleoresin. The evaporation of the alcohol and water may take place at any absolute pressure below about 25 inches Hg. The final temperature should be about 200° F. when the absolute pressure is 24 inches Hg and correspondingly lower if the pressure is lower. The most practical procedure for removing the alcohol and water is by means of continuous steam stripping at an absolute pressure of 25" Hg or less.

The preferred liquid flavoring for use in my imitation black pepper is the purified extract of oleoresin capsicum which is obtained in the above manner. This might be included in proportions of from ½ to 6% by weight of the triglyceride hard fat. However, the crude oleoresin capsicum itself can be used or other peppery oils or essences can be substituted for this preferred liquid ingredient. It should be understood, however, that if oleoresin capsicum is used for this purpose about 7 to 5 times as much might be required as would be necessary if my special concentrated extract were used. Thus, in this case about 20 parts of oleoresin capsicum should preferably be dissolved in 80 parts of melted hard fat or hydrogenated oil preparatory to forming the "hot" particles by spray cooling. However, the amount of oleoresin capsicum included might range from 5 to 25% of the triglyceride hard fat. Similar adjustments will be necessary in proportions if imitation oils of black pepper or other synthetic pungent chemical compounds are used, the exact proportions depending upon the strength and pungency of the active principle and the use for which the final product is intended.

As regards the hard fat or hydrogenated oil which is used as the carrier in preparing these solid "hot" particles from the liquid flavoring, any neutral edible triglyceride material with a melting point sufficiently low (not over 200° F.) that it will not damage either the fatty carrier or the liquid flavoring can be used, provided the melting or softening point of the resulting spray-cooled "hot" particles is sufficiently high to prevent their caking or lumping together during storage, shipment or other handling and to insure their friability at mouth temperatures. For example, almost any of the common vegetable oils or butters (other than those of the coconut oil group) or any of the animal fats can be hydrogenated and/or fractionated sufficiently to serve in this manner. In general, the hard fat or oil to be used for this purpose should have a melting point sufficiently high that the melting point of the flavored spray cooled particles will be at least 15° F. and preferably 20° F. above the highest temperature at which it is expected that they will be stored. Thus, most of the vegetable oils except those of the coconut oil group and most animal fats when thoroughly hydrogenated, i. e. to an iodine value of 8.0 or less, will be suitable under any condition, because the melting point of such products is about 140° F. or higher. Among such materials should be mentioned specifically hydrogenated oils of the following substances: cottonseed, olives, corn, peanuts, soybeans, and hydrogenated animal fats of hogs, cattle and sheep, e. g. lard, oleo oil, oleo stock, oleostearin, tallow etc. Also some natural fats are sufficiently hard to require neither hydrogenation nor fractionation, e. g. some of the vegetable butters such as Chinese vegetable tallow. However, in general the melting point of the hard fat or hydrogenated oil which is used for the carrier in accordance with the teachings of this invention should never be below about 120° F. and depending upon the amount of flavoring dissolved therein and the extent to which this will lower the melting point of the finished particles, a minimum melting point of 125–140° F. may be required.

In place of the flour and bran mixture which was employed as the base in compounding the specific imitation black pepper described in step (3) above, any other dry, edible starchy and/or proteinaceous derivatives of cereals, grains, seeds, nuts or plants a part of which has been suitably roasted and blended with lighter colored portions to give the variegated color pattern of natural black pepper could also be substituted. A large part of this base material should, of course, be comminuted to correspond closely to the particle size to which natural black pepper is usually ground which is about 24–80 mesh (Tyler).

Depending also upon the particle size of the natural black pepper which is added for aroma and the concentration of active peppery principle in the "hot" particles, considerable variation is possible in the proportions in which these materials are combined with the base. For example 2 to 10% of finely ground natural black pepper might be used. However, in our preferred product at least 5% natural black pepper is used and the strength and size of the "hot" particles is preferably adjusted so that somewhere between 2% and 15% of them by weight gives about the right degree of pungency.

These "hot" and pungent or pepper-like particles which are contemplated by my invention are not limited to use in imitation black peppers by any means. In fact, such particles are ideal for distribution in all sorts of prepared foods especially chopped meats, meat loafs, sausages, lunch meats, relishes, sauces etc. and their use in this manner is strongly recommended. In some cases "hot" particles of very much larger or smaller diameter than the range preferred for use in imitation black pepper may be desirable for such other uses.

Neither is my invention limited to the preparation of spray cooled particles containing pepper-like flavorings. Many other types of pungent or spicy liquid flavoring oils, essences, oleoresins and other zesty flavorings which are liquid in nature and soluble or miscible at a suitable temperature in fixed glyceride oils or fats may be used. For example, oleoresins of ginger may also be used as well as oils of sage, pimenta, corriander, parsley, caraway, cassia, nutmeg, cardamon, cloves, celery, thyme, dill, mace, cinnamon and peppermint and the like. In some cases as little of these materials as ½% by weight of the triglyceride hard fat can produce the desired effect and as much as 25% by weight can be added provided the solvent power and melting point of the fatty material employed is sufficiently high. A specific example of another type of practical flavoring prepared according to my invention is given below:

About 5 parts by weight of oil of cloves is dissolved in 95 parts of melted oleostearine, a product obtained from beef tallow by fractional crystallization and having a melting point of about 130° F. and an iodine value of about 20. This solution is then spray cooled from an atomizing nozzle operating at a temperature of about 140° F. and a pressure of 20 p. s. i., and located at a height of about 8 ft. above the receiving reservoir. The resulting product is collected in the reservoir in the form of dry solid particles substantially spherical in shape and averaging about 0.5 mm. in diameter. This product is free-flowing, non-caking and easy to handle and is ideally suited for use in flavoring foods, especially table-ready, solid or semi-solid food products such as meats and relishes.

Vegetable stearines and/or other hard edible shortenings could be used in place of the oleostearine in the above example, provided the hardness or degree of saturation of same is sufficient to give a finished product with a melting point at least as high as about 120° F. Also, other essential spice oils or mixtures of same could be used in place of or in conjunction with the oil of cloves in the above example, such as oil of mace, oil of cardamon, and oil of nutmeg. The total concentration of flavoring oils in the finished spray cooled particles may be as high as desired provided the hard fat employed has sufficient solvent power and a sufficiently high melting point that the finished product will be uniform in composition and have a melting point at least about as high as 120° F. However, generally speaking the concentration of essential flavoring oils in the finished spray-cooled particles will not be greater than about 20% by weight.

It should be understood that the above examples are illustrative only and in no way exhaustive of the many different variations of which the present invention is susceptible both as to nature and proportions of the components and conditions for processing same. Accordingly, the scope of the present invention is not to be limited by the said examples but only by the language of the following claims.

What I claim is:

1. A stable, non-caking, pulverulent solid seasoning product in the form of small friable sphere-like grains and especially suitable for imparting an authoritative bite or peppery taste to foods comprising a spray-cooled edible triglyceride hard fat characterized by a bland mild flavor and a melting point of at least about 120° F. and not over 200° F. having dissolved therein from ½ to 25% by weight, based on the weight of said hard fat, of the extracted principles of a hot pungent aromatic spice the said sphere-like grains having a melting point of at least 115° F.

2. An imitation black pepper comprising as the base 75–96% of roasted, finely-ground carbohydrate characterized by a mottled white to brown to black color, as the chief source of aroma 2–10% of finely-ground natural black pepper and as the pungent fraction 2–15% of friable "hot" particles characterized by a melting point of at least 115° F. comprising spray-cooled bland-tasting edible triglyceride fat having a melting point of at least about 120° F. and not over 200° F., containing dissolved therein from about 1 to about 20% by weight of an extract of capsicum peppers.

3. An imitation black pepper comprising as the base about 96–75% of edible vegetable seed components suitably roasted, as the chief source of aroma 2–10% natural black pepper ground to a fineness below 200 mesh, and as the pungent fraction 2–15% of friable "hot" particles characterized by a melting point of at least 115° F. comprising spray-cooled bland-tasting edible triglyceride fat hardened to a melting point of at least about 120° F. and not over 200° F., containing dissolved therein from about ½ to 6% of the alcohol- and water-free diluted-ethanol extract of oleoresin capsicum.

4. An imitation black pepper comprising as the base about 55 parts by weight of roasted cottonseed hull bran ground to between 30 and 80 mesh, about 30 parts by weight of wheat flour, and about 5 parts by weight of cottonseed flour; as the chief source of aroma about 5 parts by weight of natural black pepper ground to a particle size less than 200 mesh, and as the pungent fraction about 5 parts by weight of friable "hot" particles comprising spray-cooled hydrogenated cottonseed oil, having a melting point of about 130 to 150° F., containing dissolved therein the alcohol- and water-free 80%-ethanol extract of oleoresin capsicum, the said extract and said cottonseed oil being present in the ratio of 16 to 484 parts by weight.

5. A process for making friable discrete "hot" particles for use in imitation black pepper and other peppery products comprising the steps of dissolving in a melted edible hard fat having a melting point above about 120° F. and not over 200° F., between about ½ and 25% by weight based on the said hard fat of an extract obtained from a pungent aromatic spice and spray cooling the resultant solution the said discrete "hot" particles having a melting point of at least 115° F.

6. The process of claim 5 in which the pungent aromatic spice is a capsicum pepper.

7. A process for making friable discrete "hot" particles for use in imitation black pepper and other peppery products comprising the steps of extracting oleoresin capsicum with ethyl alcohol of 70 to 90% concentration, centrifuging the resultant mixture to separate out the non-alcoholic phase, drawing off the alcoholic phase and evaporating alcohol and water therefrom, then dissolving between about ½ and 6% by weight of the pungent, brown oily resinous residue thus obtained in a melted edible hard fat and spray cooling the resultant solution, the said edible hard fat having a melting point in the range from 120° F. to 200° F. and sufficient to produce discrete "hot" particles having a melting point of at least 115° F.

References Cited in the file of this patent

UNITED STATES PATENTS

| | | |
|---|---|---|
| 1,829,431 | Allen | Oct. 27, 1931 |
| 2,449,411 | Rapaport | Sept. 14, 1948 |
| 2,471,434 | Kimball et al. | May 31, 1949 |
| 2,566,410 | Griffin | Sept. 4, 1951 |

FOREIGN PATENTS

| | | |
|---|---|---|
| 643,508 | Great Britain | Sept. 20, 1950 |